United States Patent
Chu et al.

(10) Patent No.: US 12,333,084 B2
(45) Date of Patent: *Jun. 17, 2025

(54) ASSISTANT DEVICE ARBITRATION USING WEARABLE DEVICE DATA

(71) Applicant: GOOGLE LLC, Mountain View, CA (US)

(72) Inventors: Alexander Chu, Berkeley, CA (US); Jarlan Perez, Norwalk, CT (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,099

(22) Filed: Apr. 22, 2024

(65) Prior Publication Data

US 2024/0272725 A1    Aug. 15, 2024

Related U.S. Application Data

(63) Continuation of application No. 17/947,458, filed on Sep. 19, 2022, now Pat. No. 11,966,518, which is a
(Continued)

(51) Int. Cl.
  *G06F 3/01*    (2006.01)
  *G02B 27/01*    (2006.01)
  *G06T 19/00*    (2011.01)

(52) U.S. Cl.
  CPC .......... *G06F 3/017* (2013.01); *G02B 27/017* (2013.01); *G06F 3/013* (2013.01); *G06T 19/006* (2013.01);
(Continued)

(58) Field of Classification Search
  CPC .......... G06F 3/011; G06F 3/017; G06F 3/167; G06F 3/013; G02B 27/017;
(Continued)

(56) References Cited

U.S. PATENT DOCUMENTS 9,646,201 B1    5/2017    Horowitz
10,248,192 B2    4/2019    Lehman et al.
(Continued)

FOREIGN PATENT DOCUMENTS

CN    110322878    10/2019
JP    2017538218    12/2017
(Continued)

OTHER PUBLICATIONS

Australian Patent Office; Notice of Acceptance issued for Application No. 2024200648, 3 pages, dated Feb. 15, 2024.
(Continued)

*Primary Examiner* — Nelson M Rosario
*Assistant Examiner* — Scott D Au
(74) *Attorney, Agent, or Firm* — Gray Ice Higdon

(57) ABSTRACT

Implementations set forth herein relate to effectuating device arbitration in a multi-device environment using data available from a wearable computing device, such as computerized glasses. The computerized glasses can include a camera, which can be used to provide image data for resolving issues related to device arbitration. In some implementations, a direction that a user is directing their computerized glasses, and/or directing their gaze (as detected by the computerized glasses with prior permission from the user), can be used to prioritize a particular device in a multi-device environment. A detected orientation of the computerized glasses can also be used to determine how to simultaneously allocate content between a graphical display of the computerized glasses and another graphical display of another client device. When content is allocated to the computerized glasses, content-specific gestures can be enabled and actionable at the computerized glasses.

20 Claims, 11 Drawing Sheets

Related U.S. Application Data continuation of application No. 17/166,763, filed on Feb. 3, 2021, now Pat. No. 11,449,149.

(52) U.S. Cl.
CPC ............... *G02B 2027/0138* (2013.01); *G02B 2027/0178* (2013.01)

(58) Field of Classification Search
CPC ...... G02B 2027/0138; G02B 2027/014; G02B 2027/0178; G06T 19/006
See application file for complete search history.

(56) References Cited

U.S. PATENT DOCUMENTS

| | | |
|---|---|---|
| 10,890,969 B2 | 1/2021 | Yuan et al. |
| 11,449,149 B2 * | 9/2022 | Chu .................... G06T 19/006 |
| 2013/0304479 A1 | 11/2013 | Teller et al. |
| 2014/0009623 A1 | 1/2014 | Lai et al. |
| 2014/0240226 A1 | 8/2014 | Faenger |
| 2016/0162020 A1 | 6/2016 | Lehman et al. |
| 2018/0113549 A1 | 4/2018 | Park et al. |
| 2018/0366118 A1 | 12/2018 | Lovitt et al. |
| 2019/0204910 A1 | 7/2019 | Held |
| 2019/0279615 A1 | 9/2019 | Ben-dor et al. |
| 2020/0202629 A1 | 6/2020 | Sharma et al. |
| 2022/0244786 A1 | 8/2022 | Chu et al. |
| 2023/0018208 A1 | 1/2023 | Chu et al. |

FOREIGN PATENT DOCUMENTS

| | | |
|---|---|---|
| JP | 2018526690 | 9/2018 |
| WO | 03063070 | 7/2003 |
| WO | 2016089638 | 6/2016 |
| WO | 2019123425 | 6/2019 |
| WO | 20220169502 | 8/2022 |

OTHER PUBLICATIONS

Japanese Patent Office; Notice of Reasons for Rejection issued in Application No. 2022-577732; 13 pages; dated Jan. 9, 2024.

Australian Patent Office; Notice of Allowance issued for Application No. 2021426284, 10 pages, dated Oct. 19, 2023.

Australian Patent Office; Examination Report issued in Application No. 2021426284; 4 pages; dated Jul. 7, 2023.

Smith, D.; Amazon Echo Frames—here's what you didn't know about Amazon's new smart glasses; https://www.cnet.com/how-to/amazon-echo-frames-heres-what-you-didnt-know-about-amazons-new-smart-glasses/; 7 pages; dated Oct. 8, 2019.

European Patent Office; Invitation to Pay Additional Fees issued in International Application No. PCT/US2021/061988; 11 pages; dated Mar. 25, 2022.

European Patent Office; International Search Report and Written Opinion issued in Application No. PCT/US2021/06 1988; 18 pages; dated May 16, 2022.

Korean Patent Office; Office Action issued in Application No. 10-2022-7046092; 34 pages; dated Feb. 24, 2024.

Intellectual Property India; Examination Report issued in Application No. 202227070164; 7 pages; dated Mar. 12, 2025.

Australian PatentOffice; Examination Report issued in Application No. 2024203585; 2 pages; dated Apr. 11, 2025.

Australian PatentOffice; Notice of Acceptance issued in Application No. 2024203585; 3 pages; dated Apr. 28, 2025.

\* cited by examiner

ASSISTANT DEVICE ARBITRATION USING WEARABLE DEVICE DATA

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

Users may engage with automated assistants using multiple client devices. For example, some users may possess a coordinated "ecosystem" of client devices comprising a combination of one or more smart phones, one or more tablet computers, one or more vehicle computing systems, one or wearable computing devices, one or more smart televisions, and/or one or more standalone interactive speakers, among other client devices. A user may engage in human-to-computer dialog with an automated assistant using any of these client devices (assuming an automated assistant client is installed). In some cases, these client devices may be scattered around the user's primary residence, secondary residence, workplace, and/or other structure. For example, mobile client devices such as smart phones, tablets, smart watches, etc., may be on the user's person and/or wherever the user last placed them. Other client devices, such as traditional desktop computers, smart televisions, and standalone interactive speakers may be more stationary but may be located at various places (e.g., rooms) within the user's home or workplace.

When a user has multiple automated assistant devices within their home, each respective assistant device may have different operating statuses, as a result of performing different actions. At such times, a user may request to modify a particular action that is ongoing at an assistant device but inadvertently cause a different assistant device to modify a different action. This can be in part because some assistant devices may solely rely on whether a respective assistant device heard a user say a command to modify a particular action. As a result, the adaptability of the assistant devices to certain multi-assistant environments can be limited when the user is not speaking directly to the assistant device they intended to interact with. For instance, the user may initialize an action at an assistant device by accident, thereby potentially requiring the user to repeat a previous spoken utterance to re-invoke the action at the desired device.

Consequently, in response to accidentally invoking a particular assistant device, memory and processing bandwidth for the particular assistant device may be momentarily consumed. Such seemingly redundant consequences can waste network resources because, for example, some assistant inputs may be processed by natural language models that are only accessible via a network connection. Furthermore, any data relevant to an inadvertently affected action would have to be re-downloaded to the desired device in furtherance of completing the affected action, and any energy wasted from canceling an energy-intensive action (e.g., controlling display backlighting, heating elements, and/or motorized appliances) may not be recoverable.

SUMMARY

Implementations set forth herein relate to device arbitration techniques that involve processing data, from computerized glasses worn by a user, to identify a suitable client device to which a user input is directed. Allowing device arbitration to be performed with data from computerized glasses can minimize a number of instances in which a client device is accidentally activated. In this way, memory, power, and network bandwidth can be preserved for those devices that are most susceptible to accidental activation from certain detected user inputs.

In some implementations, a user can be located in an environment that includes multiple assistant-enabled devices, such as in a living room of a home of the user. The assistant-enabled devices can be activated in response to a user input, such as a spoken utterance. Furthermore, the assistant-enabled devices can assist with device arbitration to identify a particular computing device that the user may have intended to invoke with the user input. The user can be wearing computerized glasses when providing the spoken utterance, and the computerized glasses can include one or more cameras that can provide image data for detecting a direction in which the user may be facing. The identified direction can then be used during device arbitration to prioritize a particular device over other devices based on the direction that the user is facing.

In some implementations, the computerized glasses can include circuitry for detecting a location of pupils of the user, to determine a gaze of the user relative to an area and/or an object in an environment. For example, the computerized glasses can include a forward facing camera that can be used to identify an area that a user is facing, and a reverse facing camera that can be used to identify the gaze of the user. When the user provides an input to an automated assistant that is accessible via multiple devices in an environment, the computerized glasses can provide information regarding user gaze to assist with device arbitration. For instance, the user can provide a spoken utterance to the automated assistant when the user is facing an area of the environment that includes multiple assistant-enabled devices. Data generated at the computerized glasses can be used to determine whether a gaze of the user is directed more towards a particular assistant-enabled device compared to the other assistant-enabled devices. When a particular device is selected based on the gaze of the user, the automated assistant can respond to the spoken utterance of the user at the particular device.

In some implementations, an assistant-enabled device that includes a camera can provide image data that can be processed, with other image data from the computerized glasses, to perform device arbitration. For instance, visual features of a user and/or environment can be determined from one or more cameras that are separate from the computerized glasses, to determine whether to prioritize a particular device during device arbitration. As an example, an appendage of a user may be directed toward a particular device, but the appendage may not be visible in a viewing window of a camera of the computerized glasses. However, an orientation of the appendage may be visible within a viewing window of a camera of another computing device (e.g., a standalone display device). In some instances, a user may be facing a particular area that includes two or more assistant-enabled devices and may provide a spoken utterance. The user may concurrently have an appendage (e.g., a hand/or a foot) that is directed toward a particular device of the two or more assistant-enabled devices when the user is providing the spoken utterance. In such instances, the image data from the other computing device (e.g., from a camera of the standalone display device) and the other image data from the computerized glasses can be processed to select a particular device for responding to the spoken utterance.

In some implementations, the computerized glasses can detect one or more different outputs (e.g., a first output, a second output, etc.) from one or more different assistant-enabled devices to determine a location and/or arrangement of the computerized glasses relative to one or more different devices. For example, to calibrate the computerized glasses for a particular user, the user can provide a spoken utterance such as, "Assistant, I'm looking at the kitchen display," while gazing at a display interface of a computing device in their kitchen. In response, image data captured via a camera of the kitchen computing device and/or other image data capture via the computerized glasses can be processed to calibrate the computerized glasses for that particular user.

In some instances, this calibration operation can enhance the performance of the computerized glasses and/or other assistant-enabled devices—in particular when a user may not typically arrange their head and/or face entirely toward an assistant-enabled device when the user is gazing at the assistant-enabled device. Additionally, this calibration operation can enhance interactions between the user and other assistant-enabled devices that may not have an integrated camera, and therefore may not be able to provide image data during device arbitration. For example, a user may be gazing at a particular assistant-enabled device but the assistant-enabled device may not be within a viewing window of an outward facing camera of the computerized glasses. The gaze detected by an inward facing camera of the computerized glasses can be used, with prior permission from the user, during device arbitration to prioritize the assistant-enabled device that the user is gazing at over other devices (e.g., another device that may be in the viewing window of the outward facing camera).

In some implementations, calibration and/or device arbitration can be performed using communications between one or more assistant-enabled devices and the computerized glasses via one or more different modalities. For example, a standalone speaker device can include a light that can illuminate for a forward facing camera of the computerized glasses to detect a location of the standalone speaker relative to the computerized glasses. Alternatively, or additionally, ultrasonic sound can be emitted by one or more devices, such as the computerized glasses and/or one or more other assistant-enabled devices, to determine locations of devices relative to other devices. In some implementations, one or more lights on a device can be detected by a camera of the computerized glasses for determining whether the device: has lost connection, is no longer synced with another device, and/or is otherwise exhibiting a particular state that can be communicated via the one or more lights. In this way, the computerized glasses can detect changes to a respective status of one or more devices as the user is wearing the computerized glasses.

In some implementations, a location of a device relative to the computerized glasses can be used to control certain features of the computerized glasses and/or one or more assistant-enabled devices. For example, content being viewed at a computing device (e.g., a television) can be associated with content being rendered at a display interface of the computerized glasses. In some instances, a user can be viewing a live stream of a sports event on their television, and can also be viewing comments from friends in the display interface of the computerized glasses. When the user leaves a vicinity of the television and/or otherwise turns their gaze away from the television, the content that was being rendered at the television can be, according to a preference of the user, rendered at the display interface of the computerized glasses. For example, when the user leaves the vicinity of a television in their living room to change their laundry in another room of their home, a change in the relative location of the computerized glasses and/or a change in a gaze of the user can be detected. Based on this change in the position of the user, additional content data can be rendered at the display interface of the computerized glasses. Alternatively, or additionally, based on this change in position of the user, a reduction in content can be effectuated at the television to preserve power and other computational resources, such as network bandwidth.

The above description is provided as an overview of some implementations of the present disclosure. Further descriptions of those implementations, and other implementations, are described in more detail below.

Other implementations may include a non-transitory computer-readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
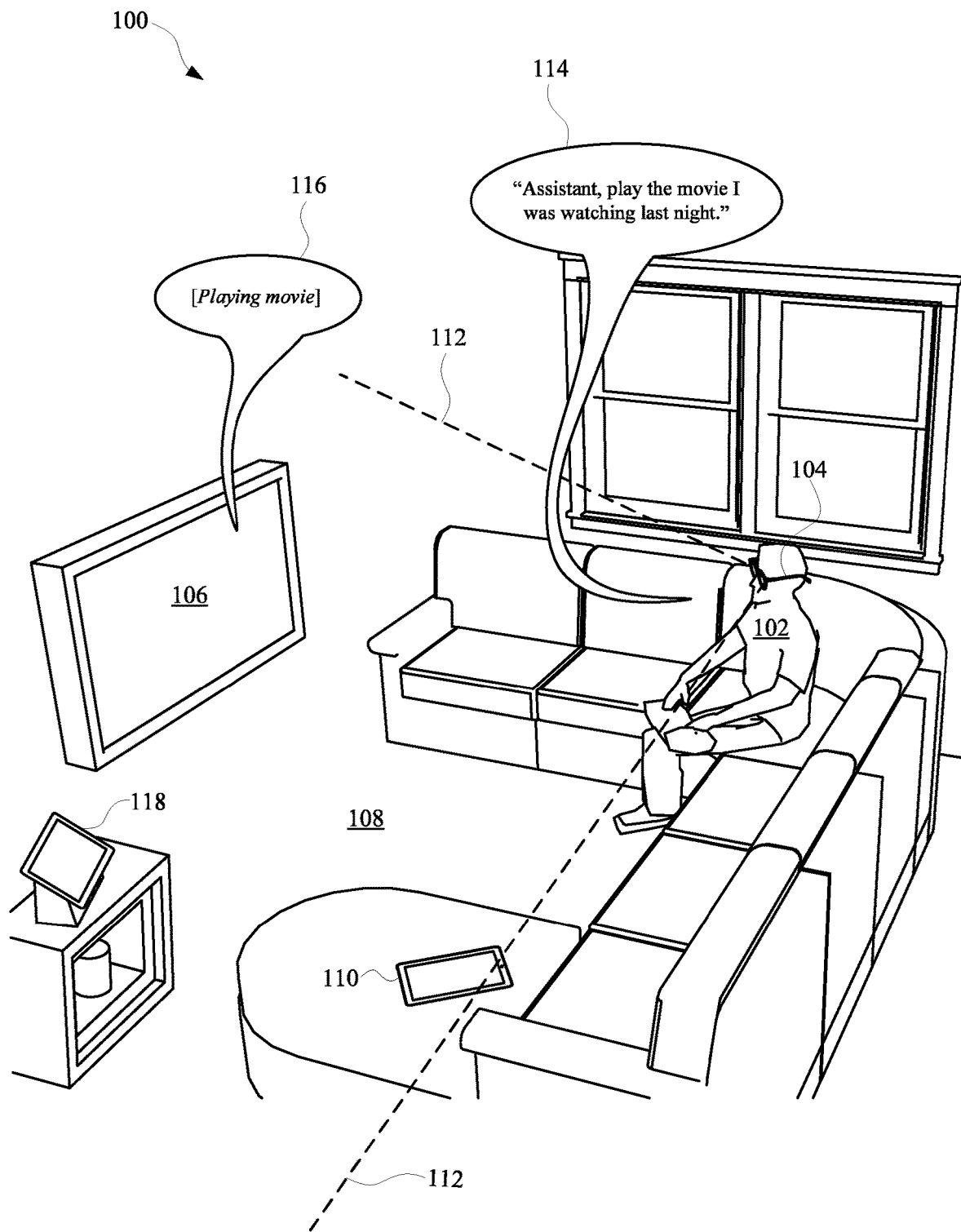
FIG. 1A and FIG. 1B illustrate views of a user invoking an automated assistant while wearing computerized glasses that can assist with device arbitration.
Figure 1B:
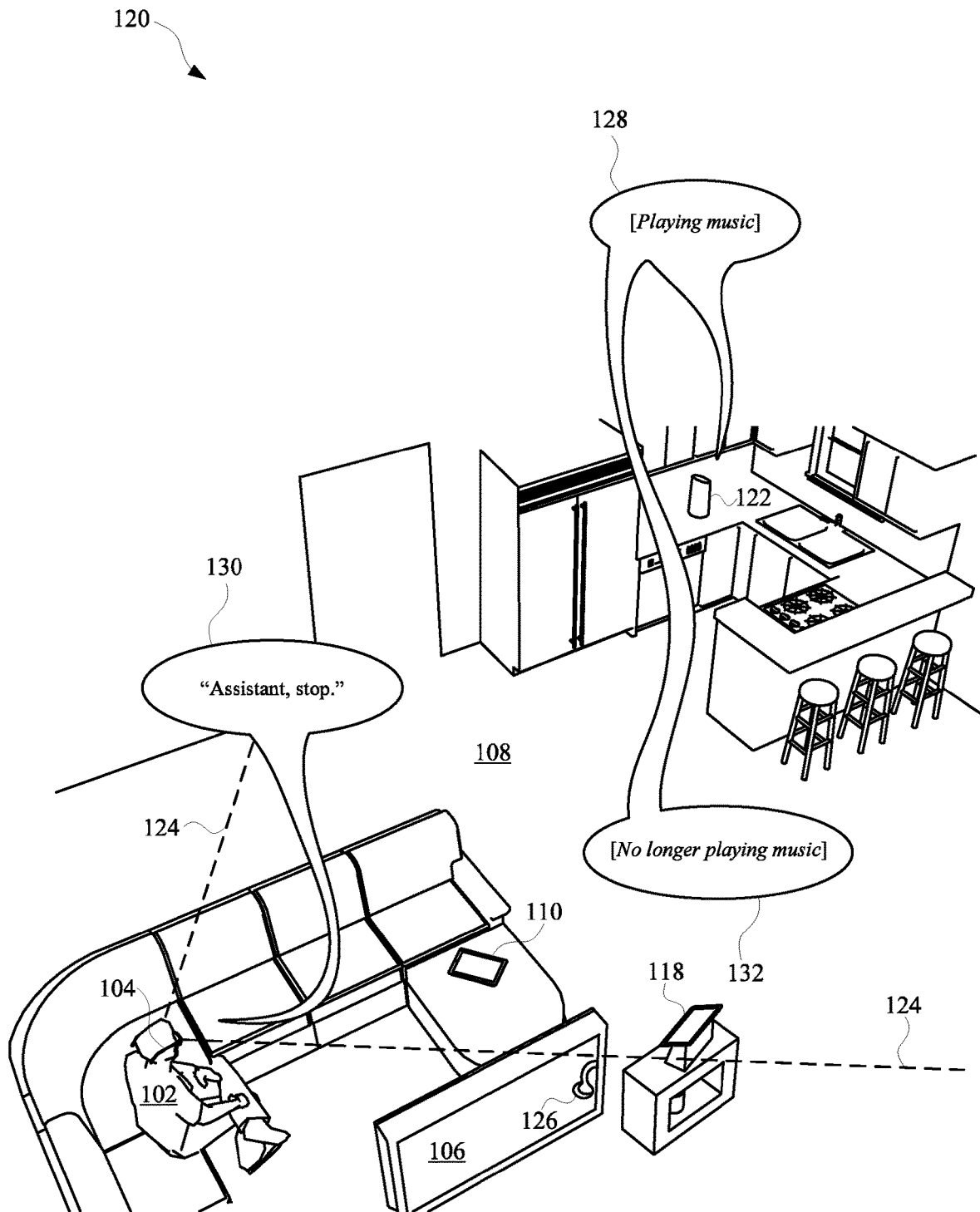

FIG. 1A and FIG. 1B illustrate a view 100 and a view 120, respectively, of a user 102 invoking an automated assistant while wearing computerized glasses 104 that can assist with device arbitration. The computerized glasses 104 can assist with device arbitration by at least providing image data characterizing a field of view 112 of the user 102 and/or the computerized glasses 104, and/or characterizing a gaze of the user 102. In this way, when assistant input is detected at multiple devices, data from the computerized glasses 104 can be used to identify a particular device to which the user 102 is directing the assistant input. For example, the user 102 can be watching television 106 while sitting in environment 108, such as a living room of the user 102. While watching television 106, a field of view 112 of the user 102 can include the television 106, a display device 118, and a tablet device 110. In some implementations, the television 106 can include a computing device that provides access to the automated assistant, or, alternatively, a dongle 126 (i.e., a detachable accessory device) can be attached to the television 106 for certain content to be rendered at the television 106. The display device 118 and the tablet device 110 can also provide the user 104 with access to the automated assistant.

While wearing the computerized glasses 104, the user 102 can provide a spoken utterance 114 such as, "Assistant, play the movie I was watching last night." The user 102 can provide the spoken utterance 114 to modify an operation of the television 106 and/or the dongle 126. However, because the user 102 is located in the environment 108 with multiple assistant-enabled devices (e.g., the tablet device 110 and the display device 118), multiple different devices can detect the spoken utterance 114 from the user 102. For example, each of the tablet device 110, the display device 118, the television 106, and the computerized glasses 104 can detect the spoken utterance 114 from the user 102. As a result, a device arbitration process can be initialized at one or more of the devices and/or a remote computing device in order to identify a particular device that the user 102 is directing the spoken utterance 114.

In some implementations, the device arbitration process can include identifying the devices that detected the spoken utterance 114 from the user 102 and also determining whether any of the identified devices are associated with the field of view 112 of the user 102. For example, a computing device that is performing the arbitration process can determine that the television 106, the display device 118, the dongle 126, and the tablet device 110 are associated with the field of view 112 of the user of 102. This determination can be based on image data generated by one or more cameras of the computerized glasses 104. The computing device can then determine that the television 106 occupies a portion of the field of view 112 that is further from a periphery or outer border of the field of view 112 than the tablet device 110 and the display device 118. Alternatively, or additionally, the computing device that is performing the arbitration process can determine that image data from another camera of the television 106 and/or the tablet device 110 indicates that an orientation of the user 102 is directed more towards the television 106 than the tablet device 110 and the display device 118.

Based on one or more of these determinations, the computing device performing the device arbitration process can determine that the television 106 is the device that the user 102 was directing the spoken utterance 114 to—instead of the display device 118. In some implementations, when the television 106 is subject to automated assistant inputs because of the dongle 126, the device arbitration process can result in a selection of the dongle 126 as being subject to the spoken utterance 114. Therefore, even though the dongle 126 may not be visible to the user 102 and/or may be hidden from the field of view 112 by the television 106, the dongle 126 may nonetheless be responsive to the spoken utterance 114 when the user 102 is directing their gaze in a direction of the dongle 126 when they provide an assistant input. For example, audio data corresponding to the spoken utterance 114 can be captured by a microphone of the tablet device 110 and another microphone of the display device 118, but the operation(s) requested by the user 102 can be performed at the television 106 and/or the dongle 126 based on image data from the computerized glasses 104. For instance, based on identifying a particular computing device to be responsive to the spoken utterance 114, the television 106 can perform an operation 116 of playing a movie per the spoken utterance 114 from the user 102, instead of the moving being played at the display device 118 or the tablet device 110.

FIG. 1B illustrates a view 120 of the user 102 changing their field of view 124 to face a computing device 122 that is located in a different area of the environment 108. The user 102 can change their orientation to direct a spoken utterance to a different device from the television 106. For example, the computing device 122 can be performing an operation 128 of playing music when the user initially provided the previous spoken utterance 114. Therefore, to shut off the music without affecting the movie at the television 106, the user 102 can direct their face and the computerized glasses 104 more towards the computing device 122 than the television 106. In some implementations, the computerized glasses 104 can include an outward facing camera with a field of view 124 (i.e., viewing window or visual perspective), and the outward facing camera can generate image data that can be used during a device arbitration process. Alternatively, or additionally, the computerized glasses 104 can include an inward facing camera, and the inward facing camera can also generate image data that can be used during the device arbitration process.

For example, image data generated using the inward facing camera can characterize a gaze of the user 102 being directed slightly upward towards the direction of the computing device 122 and away from the tablet device 110. In this way, despite a microphone of the computing device 122 not detecting spoken inputs as clearly as the tablet device 110 or the display device 118 (at least when the user 102 is positioned as depicted in FIG. 1B), the image data from the inward facing camera can indicate that the gaze of the user 102 is directed at the computing device 122. For example, the user 102 can provide a spoken utterance 130 such as, "Assistant, stop," when the television 106 is playing a movie and the computing device 122 is playing music. In order to determine that the computing device 122 is intended to be the target of the spoken utterance 130, image data from one or more cameras of the computerized glasses 104, and/or data from one or more other devices, can be processed during a device arbitration process.

In some implementations, a heuristics process and/or one or more trained machine learning models can be used during the device arbitration process to select a particular device to be responsive to an input from a user. For example, one or more trained machine learning models can be used to process image data from the inward facing camera and other image data from an outward facing camera to identify a device that a user input is directed to. Alternatively, or additionally, a heuristic process can be used to determine whether to prioritize a particular device over other candidate devices based on data from one or more sources. For example, a device that is not located in a field of view of a user and/or computerized glasses can be considered to have less of a priority than another device that is determined to be within the field of view of the user and/or the computerized glasses. For instance, when the computing device 122 is prioritized over other devices in the environment 108, one or more operations can be performed at the computing device 122 to satisfy a user request embodied in the spoken utterance 130. For example, a computing device 122 can perform an operation 132 to cause music to no longer be playing at the computing device 122.

Figure 2:
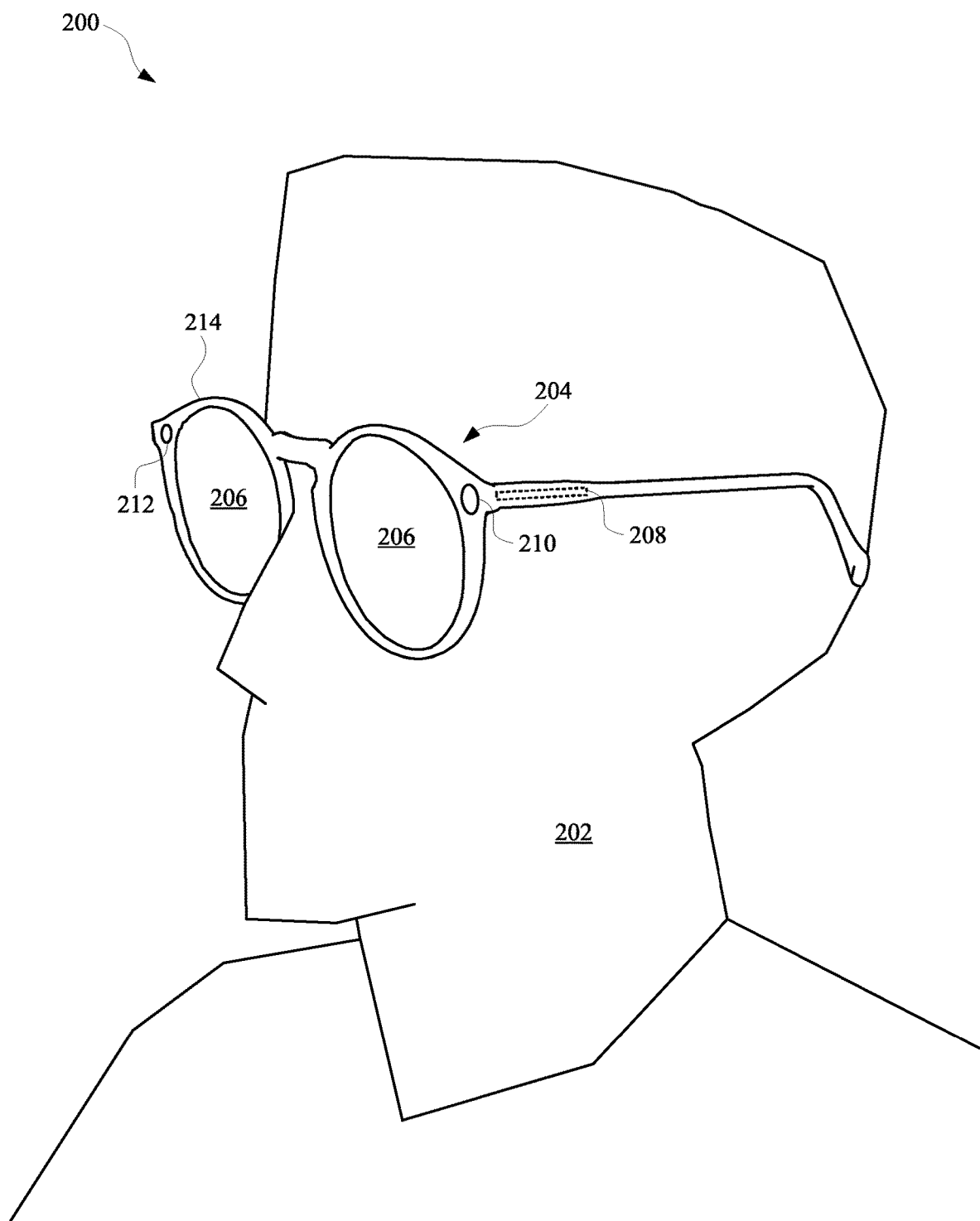
FIG. 2 illustrates a view of a user wearing computerized glasses according to some implementations discussed herein.

FIG. 2 illustrates a view 200 of a user 202 wearing computerized glasses 204 according to some implementations discussed herein. The computerized glasses 204 can include a computer 208, which can include one or more processors and/or one or more memory devices, and can receive power from one or more energy sources (e.g., battery, wireless power transfer, etc.). The computer 208 can be at least partially embodied by a housing 214 and/or can be separate from the housing 214. The housing 214 can resemble frames of one or more different styles of eyeglasses and can have one or more lenses 206 attached to the housing 214. In some implementations, the computerized glasses 204 can include one or more forward facing cameras 210, which can be arranged to have a field of view that corresponds to a field of view of the user 202. In some implementations, the computerized glasses 204 can include one or more inward facing cameras 212, which can be arranged to have another field of view that includes one or more eyes of the user 202. For example, one or more inward facing cameras 212 can be arranged to capture image data characterizing a position of a left eye and/or a right eye of the user 202. In some implementations, the computer 208 can be connected to one or more antennas and/or other communication hardware that allows the computer 208 to communicate with one or more other computing devices. For example, the computerized glasses 204 can connect to a Wi-Fi network, LTE network, and/or can communicate via Bluetooth protocol, and/or any other communications modality.

In some implementations, the one or more lenses 206 can operate as a display interface for rendering graphical content that is visible to a user who is wearing the computerized glasses 204. The graphical content that is rendered at the lenses 206 can assist with device arbitration in response to multiple devices detecting an input from the user 202. For example, the user 202 can be directing their head and the computerized glasses 204 toward a direction that causes a first computing device and a second computing device to be in a field of view of the forward facing camera 210. When the user 202 is directed the computerized glasses 204 in this direction, the user 202 can provide a spoken utterance to, for example, cause a particular computing device to play music from a music application. The automated assistant can detect the spoken utterance and, in response, cause multiple instances of an icon for the music application to be rendered in the lenses 206. For example, a first instance of the music application icon can be rendered in the lenses 206 above the first computing device and a second instance of the music application icon can be rendered in the lenses 206 above the second computing device.

In some implementations, each instance of the music application icon can be rendered in a way that indicates to the user that a particular device has not been selected to respond to the spoken utterance. For example, each instance of the music application icon can be "grayed out," blurry, blinking, and/or otherwise have one or more features that indicate that one of the devices should be selected by the user. In order to select one of the devices, the user 202 can adjust their gaze and/or the direction of the computerized glasses 204 more towards the first computing device or the second computing device. In response, the automated assistant can detect the adjustment of the gaze and/or facing direction of the user and cause the first instance or the second instance of the music application icon to provide feedback that one has been selected. For example, when the user 202 directs their gaze and/or the computerized glasses 204 more towards the first computing device, the first instance of the music application can icon blink, shake, become idle, no long be grayed out, no longer be blurry, and/or otherwise indicate that the first computing device has been selected. In this way, the user 202 can receive feedback that they have selected a particular device and redirect their gaze and/or the computerized glasses 204 if they prefer the second computing device. In some implementations, if the user 202 is satisfied with their selection the user 202 can continue to look at the first computing device for a threshold period of time, or look away from both computing devices, in order to confirm their selection and cause the first computing device to be responsive to the spoken utterance.

In some implementations, graphical content rendered at the lenses 206 can assist with clarifying parameters of a particular request submitted by the user to an automated assistant and/or another application. For example, the user 202 can provide a spoken utterance such as, "Play some music," and, in response, the automated assistant can cause a first icon for a first music application and a second icon for a second music application to be rendered in the lenses 206. The icons can be rendered at or near a particular computing device that the user 202 is directing their attention towards, and the icons can be rendered to provide feedback to encourage the user 202 to select a particular music application for rendering the music. In some implementations, a timer can also be rendered at the lenses 206 in order to indicate an amount of time that the user has before a particular music application is selected. For example, the automated assistant can cause a particular icon to be rendered to provide visual feedback indicating that the music application corresponding to that particular icon will be selected by default if the user 202 does not provide additional input that indicates whether they favor one application over the other.

In some implementations, graphical content rendered at the lenses 206 can correspond to parameters to be provided to an application in response to an assistant input from the user 202. For example, in response to the spoken utterance, "Play the new song," the automated assistant can cause a first graphical element and a second graphical element to be rendered in the lenses 206 at or near a particular audio device. The first graphical element can include text that identifies the name of a first song, and the second graphical element can include text that identifies the name of a second song. In this way, the user 202 can be put on notice that there was some ambiguity to the spoken utterance they provided, and that additional input may be needed in order for a particular song to be selected. The user 202 can then provide an additional input (e.g., adjust their gaze, rotate their head, perform a gesture, tap the housing 214 while gazing at a particular icon, provide another spoken utterance, and/or provide any other input) in order to specify a particular song. In some implementations, as a change in orientation of the user 202 is detected, the graphical content rendered in the lenses 206 can be adjusted according to the change in orientation. For example, an icon that is rendered to appear above a computing device that the user 202 looking at can be shifted in the lenses 206 in a direction that is opposite relative to a direction that the user 202 has rotated their head.

Similarly, the icon can no longer be rendered in the lenses 206 when the computing device is no longer in a field of view of the user 202 and/or the computerized glasses 204.

FIG. 3A, FIG. 3B, FIG. 3C, FIG. 3D, and FIG. 3E, illustrate a view 300, a view 320, a view 340, a view 360, and a view 380, respectively, of a user 302 interacting with an automated assistant that can rely on computerized glasses 304 for device arbitration. These figures illustrate at least an instance in which the user 302 causes certain operations to be performed at a computing device in a room, and then relocates to a separate room but maintains the ability to provide assistant inputs to the computerized glasses 304 to control the operations. For example, the user 302 can provide a spoken utterance 312 such as, "Assistant, play footage from the security camera from last night." The spoken utterance 312 can include a request for the automated assistant to access a security application and render video data from the security application at a display device accessible to the automated assistant.

In some implementations, in order to determine a particular device that the user 302 is intending the video data to be rendered at, the automated assistant can cause one or more devices to provide one or more different outputs, respectively. The outputs can be detected by computerized glasses 304 being worn by the user 302 when the user provided the spoken utterance 312. For example, the automated assistant can identify one or more candidate devices that detected the spoken utterance 312. In some implementations, the automated assistant can cause each candidate device to provide an output. The output that is caused to be provided at each candidate device can be distinct relative to the output(s) that are caused to be provided at the other candidate device(s). Put another way, each of the candidate devices can be caused to provide a corresponding unique output. In some implementations, the automated assistant causes the output at a candidate device to be rendered one or more times at the candidate device and causes each rendering to be for less than a given duration of time, such as less than a tenth of a second or less than fifty milliseconds. In some of those and/or other implementations, the output rendered at a candidate device can be output that may not be detectable by a human without an artificial modality. For example, the automated assistant can cause a television 306 and a tablet device 310 to incorporate an image into one or more graphical content frames being rendered at the television 306 and the tablet device 310, respectively. The frames that include the image can be rendered at a frequency that is greater than a frame frequency detectable by humans (e.g., greater than or equal to 60 frames per second). In this way, if the user 302 is facing the television 306 when they provided the spoken utterance 312, a forward facing camera of the computerized glasses 304 can detect the image in one or more frames without the user 302 being interrupted. Alternatively, or additionally, when both the television 306 and the tablet device 310 are within a field of view of the forward facing camera and/or the user 302, the automated assistant can determine that the television 306 occupies more of the focal point of the user 302, and/or the computerized glasses 304, than the tablet device 310.

In some implementations, the automated assistant can determine that the television 306 and the tablet device 310 are near the computerized glasses 304 and/or the user 302 when the user 302 provides a spoken utterance. Based on this determination, the automated assistant can cause the television 306 and the tablet device 310 to render different images to identify the device that is in the field of view of the camera and/or the computerized glasses 304. The automated assistant can then determine whether one or more cameras of the computerized glasses 304 have detected one image but not another image, in order to identify the particular device that the user 302 is directing their input.

In some implementations, one or more devices in an environment can include LEDs that can be controlled by each corresponding device and/or an automated assistant during device arbitration. Light emitted from the LEDs can then be detected in order to select a particular device that will be responsive to an input from the user 302. For example, in response to a spoken utterance from the user 302 being detected at a first device and a second device, the automated assistant can cause a first LED of the first device and a second LED of the second device to illuminate. When the automated assistant determines that light emitted from the first LED, but not the second LED, is being detected by the computerized glasses 304, the automated assistant can select the first device to be responsive to the spoken utterance. Alternatively, or additionally, the automated assistant can cause each LED to illuminate to exhibit certain properties in order to assist with device arbitration. For example, the first LED can illuminate such that a property of the light emitted by the first LED is different from a property of other light emitted by the second LED. Such properties can include color, amplitude, duration, frequency, and/or any other property of light that can be controlled by an application and/or device. For example, the automated assistant can cause the first LED to illuminate for 0.1 seconds every 0.5 seconds, and the second LED to illuminate for 0.05 seconds every 0.35 seconds. In this way, one or more cameras of the computerized glasses 304 can detect these patterns of light, and the automated assistant can correlate each detected pattern to each respective device. The automated assistant can then identify the LED that the user 302 is directing their gaze and/or computerized glasses 304 towards in order to select a particular device that will be responsive to the user input.

In some instances, the automated assistant can determine that the spoken utterance 312 is directed to the television 306, and can cause the television of 306 to perform an operation 314 of playing camera footage from the security camera at the television 306. For example, the automated assistant can cause a security application to be accessed at the television 306 to render the security footage that the user 302 is requesting. When the security application is launched, an icon 330 identifying the security application and selectable GUI elements 332 (i.e., graphical elements) can be rendered at the television 306. In order to identify certain features of the camera footage, the user 302 can listen to audio 316 from the television 306 and view the video rendered at a display interface of the television 306. Furthermore, the user 302 can perform various physical gestures to control the television 306 and/or the security application via the computerized glasses 304. For example, the computerized glasses 304 can include an outward facing camera 322 that can capture image data for processing by the automated assistant. For instance, when the user 302 performs a swipe gesture 326, the automated assistant can detect the swipe gesture 326 and cause the security application to perform a particular operation corresponding to the swipe gesture 326 (e.g., fast forward).

Figure 3A:
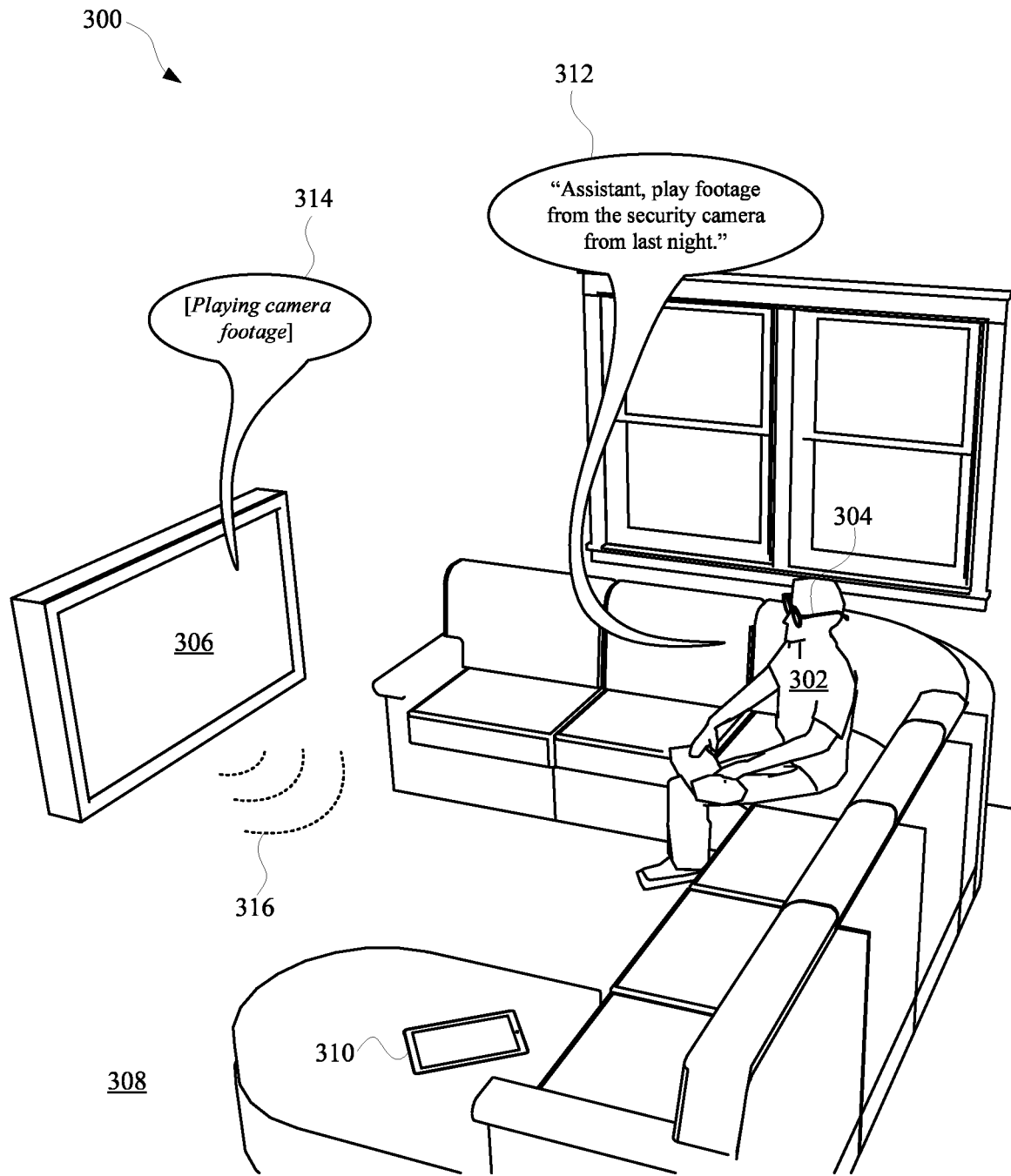
FIG. 3A, FIG. 3B, FIG. 3C, FIG. 3D, and FIG. 3E illustrate views of a user interacting with an automated assistant that can rely on computerized glasses for device arbitration.
Figure 3B:
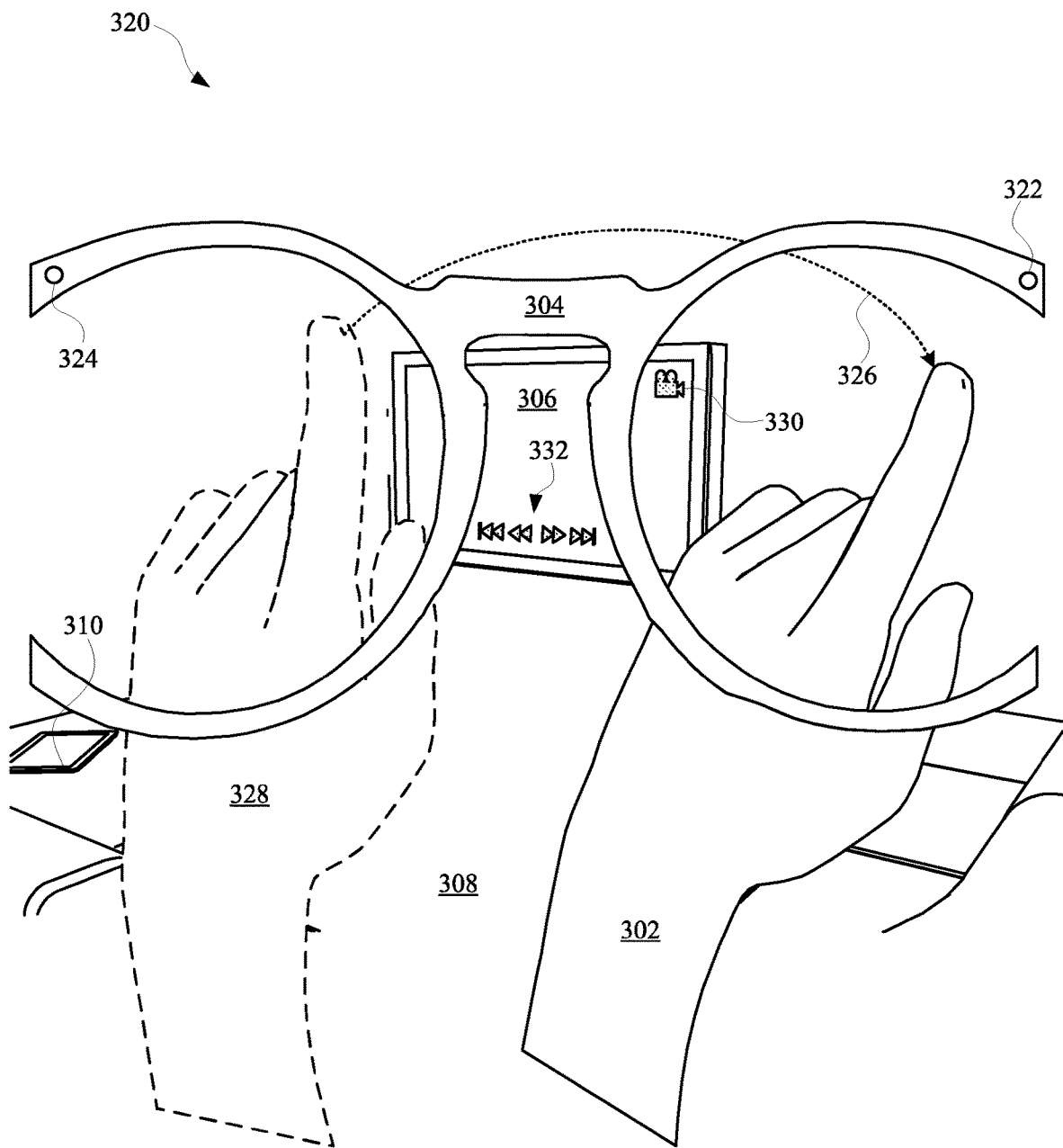
Figure 3C:
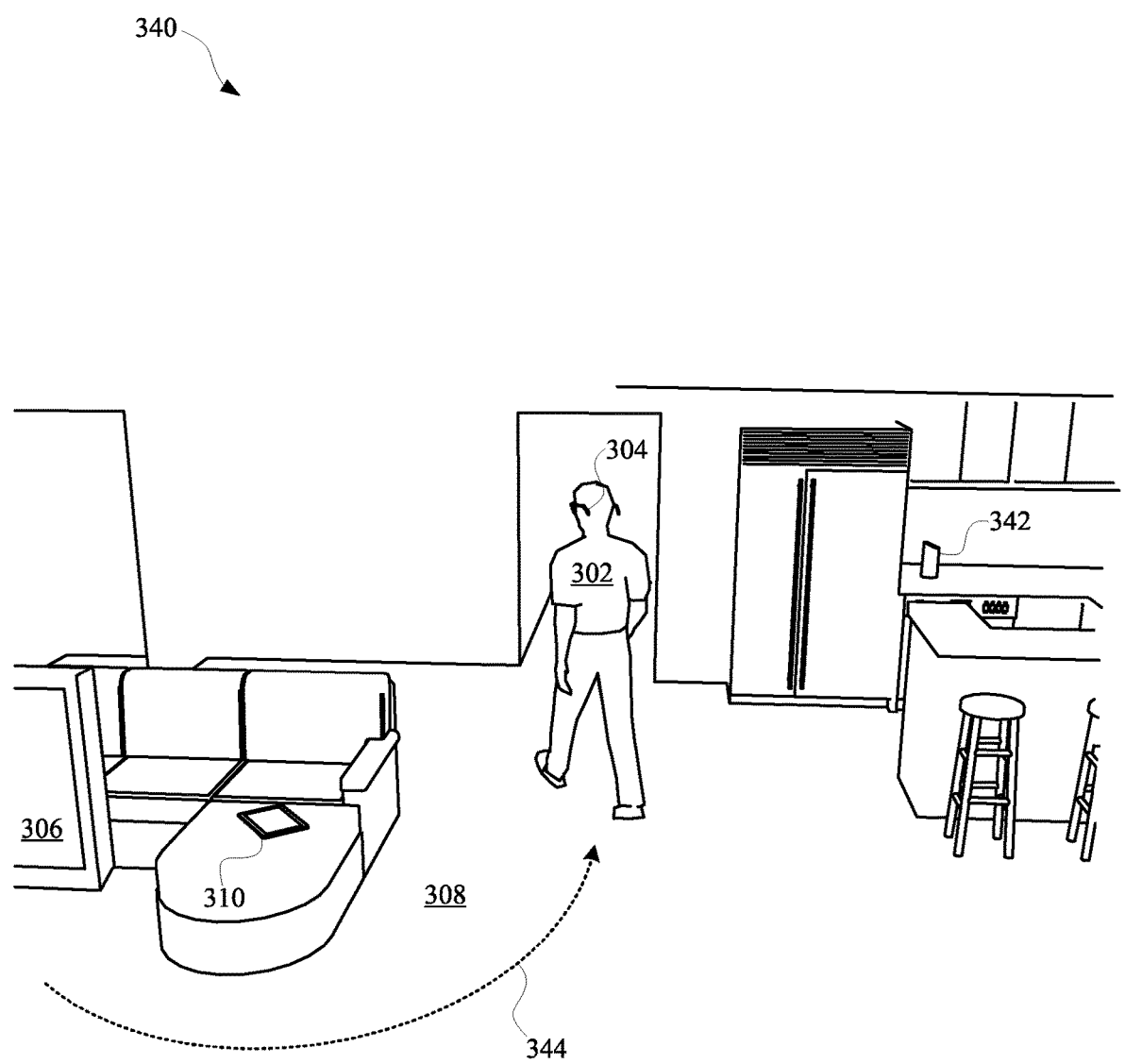
Figure 3D:
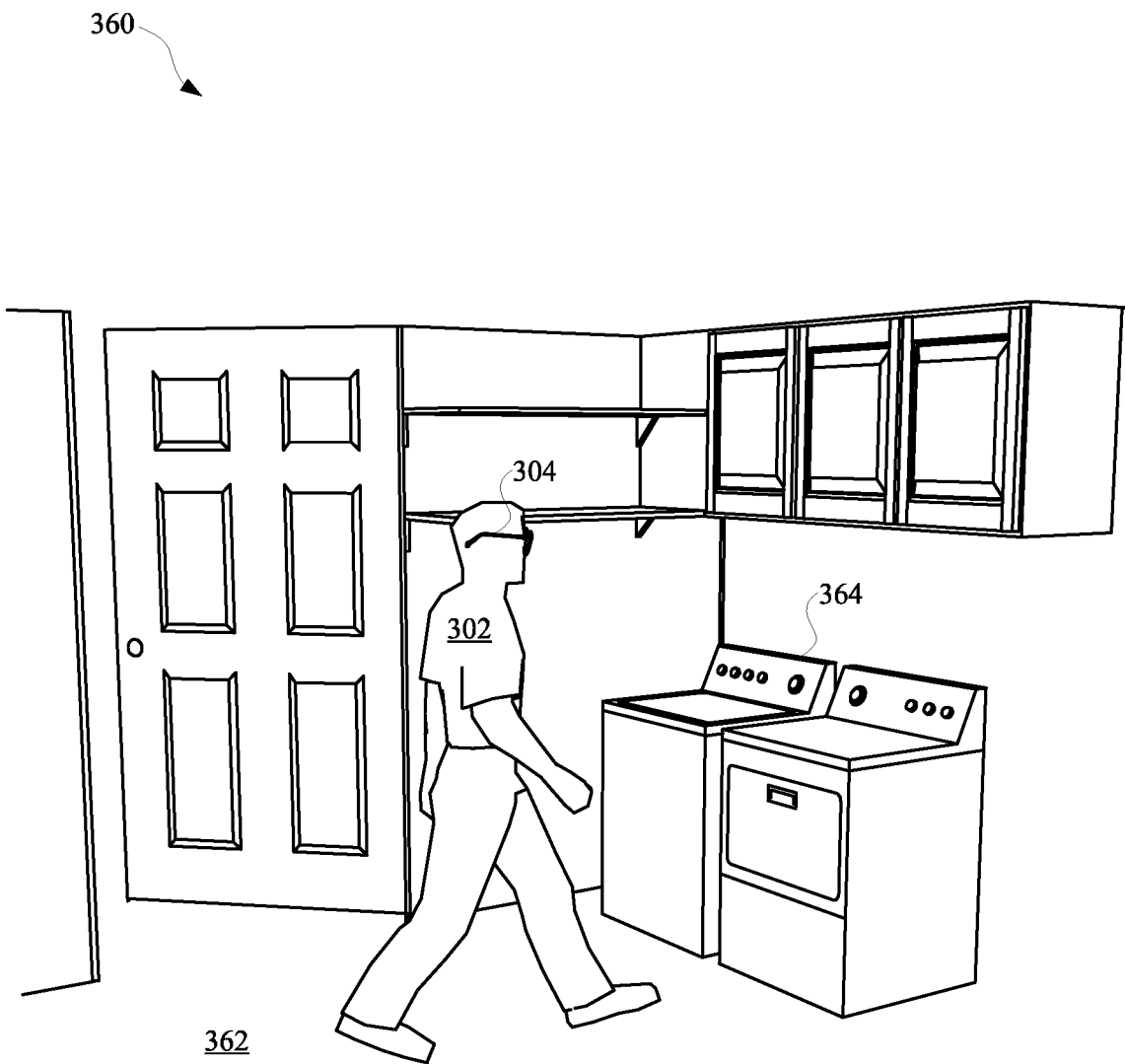
Figure 3E:
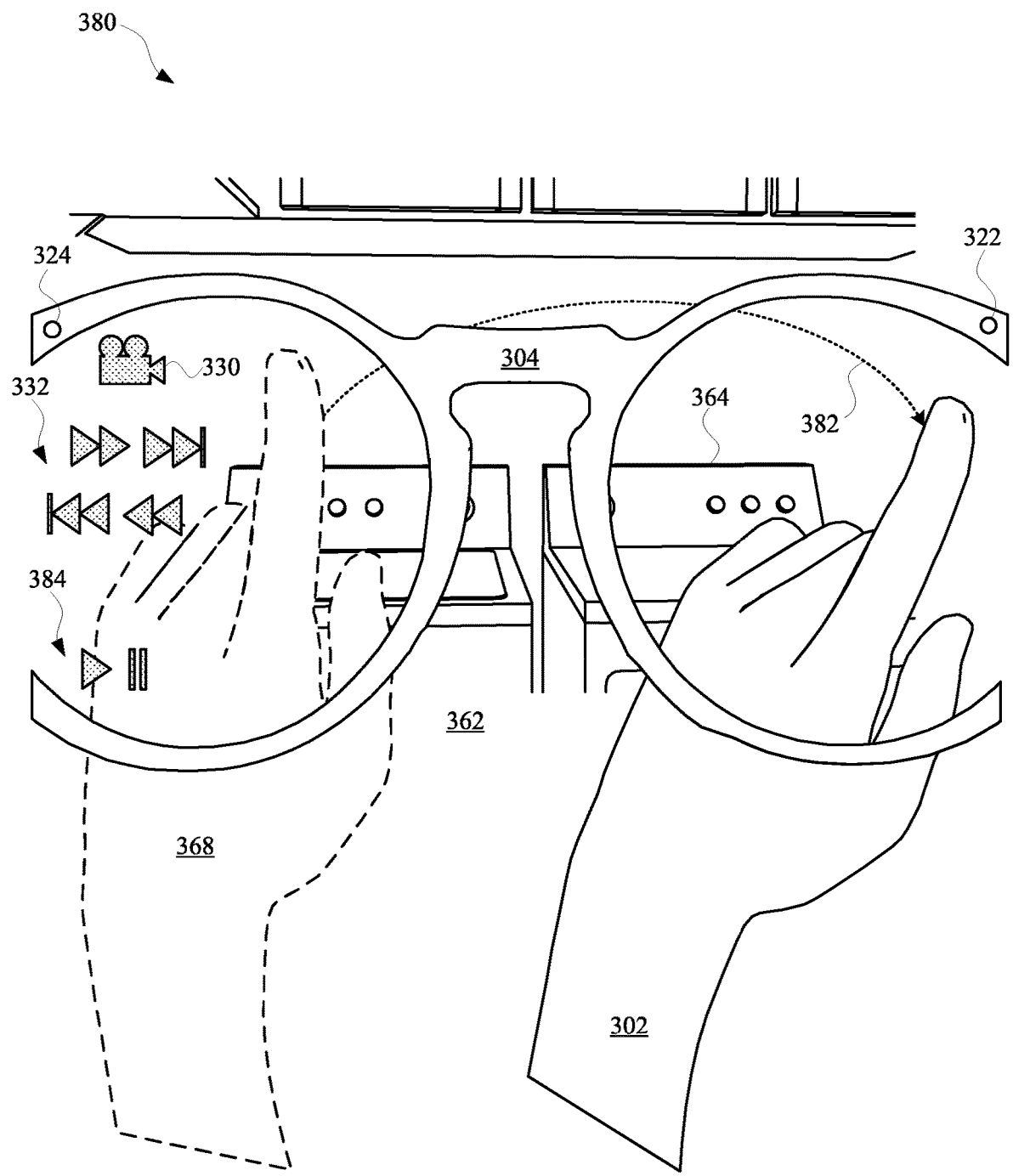

In some implementations, that user 302 can relocate to another room in their home to cause the computerized glasses 304 to operate in a way that reflects a relocation 344 of the user 302. For example, the user 302 can relocate, as illustrated in FIG. 3C and FIG. 3D, from the environment 308 to a separate environment 362 to change their laundry 364, while also still listening to audio 316 from the security application. The computerized glasses 304 can provide an interface for controlling the security application and/or the automated assistant in response to the user 302 relocating away from the television 306. In some implementations, a determination that the user 302 has relocated can be based on data generated at the computerized glasses and/or one or more other devices in the environment 308. In some implementations, the computerized glasses 304 can indicate that the user 302 can control an application and/or device that they were previously observing through the computerized glasses 304. For example, an icon 330 representing the security application can be rendered in a display interface of the computerized glasses 304. Alternatively, or additionally, selectable GUI elements 332 and graphical elements 384 that were rendered at the television 306 can be rendered at the display interface of the computerized glasses 304 in response to the user 302 redirecting their gaze and/or face away from the television 306.

In some implementations, device arbitration can be performed using the computerized glasses 304 when the user 302 may not be looking at a device and/or otherwise directing their attention towards another computer device. For example, and as provided in FIG. 3E, the user 302 can perform a gesture 382 to provide an input to the automated assistant, a particular application, and/or a particular computing device. One or more cameras (e.g., an outward facing camera 322) of the computerized glasses can detect the physical gesture, which can be a physical gesture in which the user 302 maneuvers their hand from a left position 368 towards the right. In response to detecting the physical gesture 382, the automated assistant can operate to identify one or more devices that detected the physical gesture. In some instances, the automated assistant may determine that only the computerized glasses 304 detected the physical gesture 382. Regardless, the automated assistant can determine whether the physical gesture 382 was intended to initialize one or more operations at the computerized glasses 304 and/or a separate device.

In some instances, the user 302 may be viewing content from the security application at the display interface of the computerized glasses 304. In such instances, the automated assistant can determine that the physical gesture 382 is intended to affect an operation of the security application. In response to the physical gesture 382, the automated assistant can cause the security application to fast forward certain content being rendered at the computerized glasses 304. Alternatively, or additionally, the automated assistant can perform a heuristics process for identifying an application and/or device to which the user 302 is directing the physical gesture 382. In some implementations, and with prior permission from the user 302, the automated assistant can determine that the user 302 was most recently gazing at the television 306, and before gazing at the television 306, the user 302 was gazing at the tablet device 310. This determination can cause the automated assistant to prioritize the television 306 over the tablet device 310 when selecting a device that will be responsive to the physical gesture 382.

Alternatively, or additionally, the automated assistant can determine, based on image data from an inward facing camera 324 of the computerized glasses 304, that the user 302 was most recently gazing at the security application at the television 306 and, before gazing at the security application, the user 302 was gazing at a social media application at the tablet device 310. Based on identifying the security application and the social media application, the automated assistant can determine that the physical gesture 382 is acceptable as an input to the security application but not as an input to the social media application. Therefore, according to this process, the automated assistant can select the security application to be responsive to the physical gesture input from the user 302.

In some implementations, device arbitration can be performed using one or more trained machine learning models that can be used to process application data and/or contextual data. The application data can, for example, characterize operating states of one or more applications that may be associated with the user 302 when the user 302 provides the physical gesture 382. Alternatively, or additionally, the contextual data can characterize features of a context in which the user 302 provided the physical gesture 382. Such features can include, but are not limited to, a location of the user 302, a time of day, one or more activities of the user (with prior permission from the user), and/or any other information that could be associated with the user 302 when the user 302 provides the physical gesture 382. For example, audio data captured by one or more microphones of the computerized glasses 304, and/or one or more other devices, can be processed to identify contextual features of an environment, with prior permission from the user 302. Audio data that captures sound from a movie can, for example, be used to assist the automated assistant with determining whether the physical gesture 382 should affect an application that is rendering the movie. When the automated assistant determines that the physical gesture 382 is intended to affect the movie (e.g., fast forward the movie through a portion of the movie that the user 302 does not want to hear), the automated assistant can generate command data that can be communicated to the application that is rendering the movie, without the user necessarily gazing at the television 306 that is displaying the movie.

Figure 4:
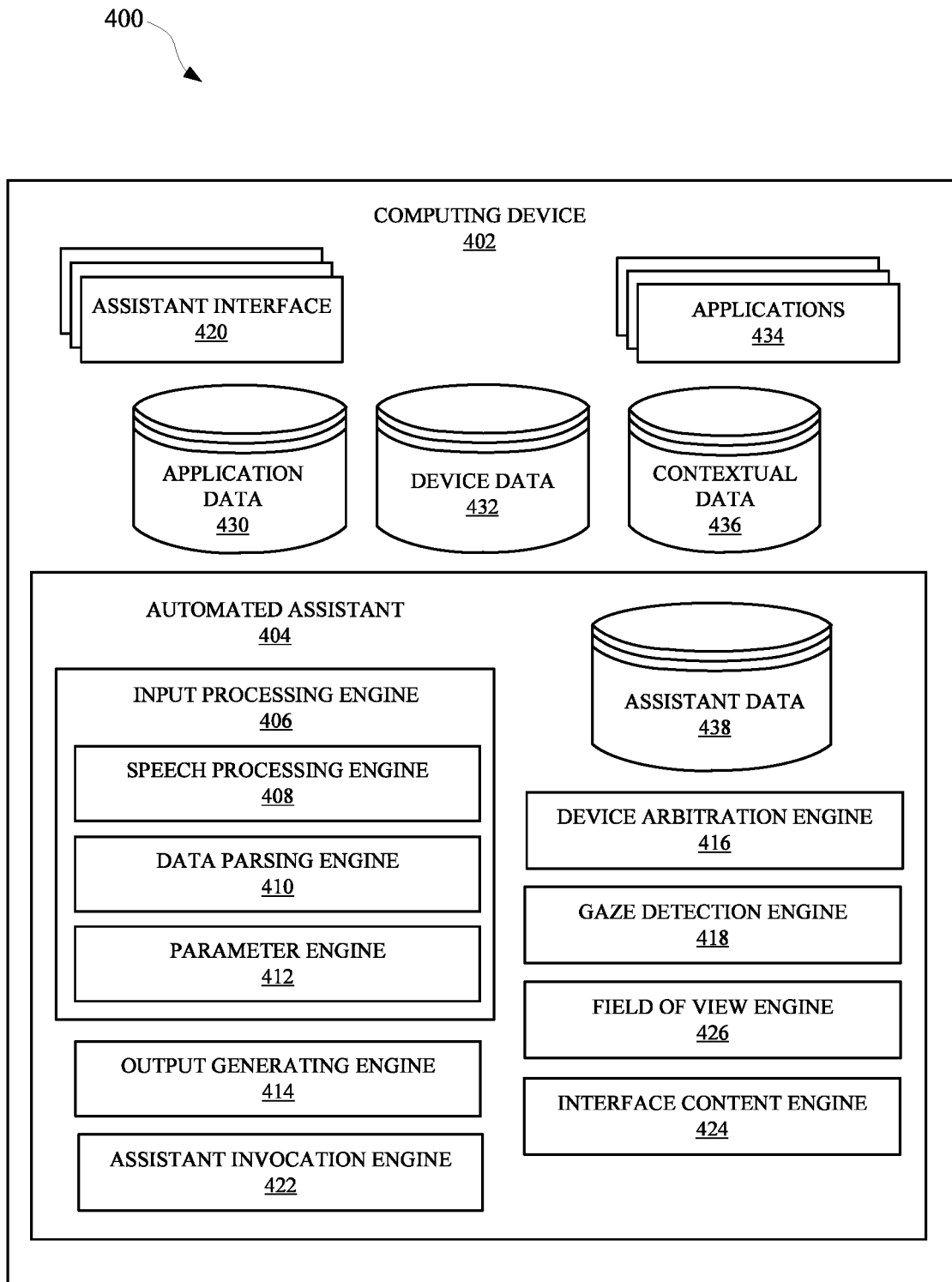
FIG. 4 illustrates a system for performing device arbitration using data available from a device, such as computerized glasses, that has functionality for performing augmented reality.

FIG. 4 illustrates a system 400 for performing device arbitration using data available from a device, such as computerized glasses, that has functionality for performing augmented reality. The automated assistant 404 can operate as part of an assistant application that is provided at one or more computing devices, such as a computing device 402 and/or a server device. A user can interact with the automated assistant 404 via assistant interface(s) 420, which can be a microphone, a camera, a touch screen display, a user interface, and/or any other apparatus capable of providing an interface between a user and an application. For instance, a user can initialize the automated assistant 404 by providing a verbal, textual, and/or a graphical input to an assistant interface 420 to cause the automated assistant 404 to initialize one or more actions (e.g., provide data, control a peripheral device, access an agent, generate an input and/or an output, etc.). Alternatively, the automated assistant 404 can be initialized based on processing of contextual data 436 using one or more trained machine learning models. The contextual data 436 can characterize one or more features of an environment in which the automated assistant 404 is accessible, and/or one or more features of a user that is predicted to be intending to interact with the automated assistant 404.

The computing device 402 can include a display device, which can be a display panel that includes a touch interface for receiving touch inputs and/or gestures for allowing a user to control applications 434 of the computing device 402 via the touch interface. In some implementations, the computing device 402 can lack a display device, thereby providing an audible user interface output, without providing a graphical user interface output. Furthermore, the computing device 402 can provide a user interface, such as a microphone, for receiving spoken natural language inputs from a user. In some implementations, the computing device 402 can include a touch interface and can be void of a camera, but can optionally include one or more other sensors. In some implementations, the computing device 402 can provide augmented reality functionality and/or can be a wearable device such as, but not limited to, computerized glasses, a contact lens, a watch, an article of clothing, and/or any other wearable device. Accordingly, although various implementations are described herein with respect to computerized glasses, techniques disclosed herein can be implemented in conjunction with other electronic devices that include augmented reality functionality, such as other wearable devices that are not computerized glasses.

The computing device 402 and/or other third party client devices can be in communication with a server device over a network, such as the internet. Additionally, the computing device 402 and any other computing devices can be in communication with each other over a local area network (LAN), such as a Wi-Fi network. The computing device 402 can offload computational tasks to the server device to conserve computational resources at the computing device 402. For instance, the server device can host the automated assistant 404, and/or computing device 402 can transmit inputs received at one or more assistant interfaces 420 to the server device. However, in some implementations, the automated assistant 404 can be hosted at the computing device 402, and various processes that can be associated with automated assistant operations can be performed at the computing device 402.

In various implementations, all or less than all aspects of the automated assistant 404 can be implemented on the computing device 402. In some of those implementations, aspects of the automated assistant 404 are implemented via the computing device 402 and can interface with a server device, which can implement other aspects of the automated assistant 404. The server device can optionally serve a plurality of users and their associated assistant applications via multiple threads. In implementations where all or less than all aspects of the automated assistant 404 are implemented via computing device 402, the automated assistant 404 can be an application that is separate from an operating system of the computing device 402 (e.g., installed "on top" of the operating system)—or can alternatively be implemented directly by the operating system of the computing device 402 (e.g., considered an application of, but integral with, the operating system).

In some implementations, the automated assistant 404 can include an input processing engine 406, which can employ multiple different modules for processing inputs and/or outputs for the computing device 402 and/or a server device. For instance, the input processing engine 406 can include a speech processing engine 408, which can process audio data received at an assistant interface 420 to identify the text embodied in the audio data. The audio data can be transmitted from, for example, the computing device 402 to the server device to preserve computational resources at the computing device 402. Additionally, or alternatively, the audio data can be exclusively processed at the computing device 402.

The process for converting the audio data to text can include a speech recognition algorithm, which can employ neural networks, and/or statistical models for identifying groups of audio data corresponding to words or phrases. The text converted from the audio data can be parsed by a data parsing engine 410 and made available to the automated assistant 404 as textual data that can be used to generate and/or identify command phrase(s), intent(s), action(s), slot value(s), and/or any other content specified by the user. In some implementations, output data provided by the data parsing engine 410 can be provided to a parameter engine 412 to determine whether the user provided an input that corresponds to a particular intent, action, and/or routine capable of being performed by the automated assistant 404 and/or an application or agent that is capable of being accessed via the automated assistant 404. For example, assistant data 438 can be stored at the server device and/or the computing device 402, and can include data that defines one or more actions capable of being performed by the automated assistant 404, as well as parameters necessary to perform the actions. The parameter engine 412 can generate one or more parameters for an intent, action, and/or slot value, and provide the one or more parameters to an output generating engine 414. The output generating engine 414 can use one or more parameters to communicate with an assistant interface 420 for providing an output to a user, and/or communicate with one or more applications 434 for providing an output to one or more applications 434.

In some implementations, the automated assistant 404 can be an application that can be installed "on top of" an operating system of the computing device 402 and/or can itself form part of (or the entirety of) the operating system of the computing device 402. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 402. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 402 can include one or more applications 434 which can be provided by a third-party entity that is different from an entity that provided the computing device 402 and/or the automated assistant 404. An application state engine of the automated assistant 404 and/or the computing device 402 can access application data 430 to determine one or more actions capable of being performed by one or more applications 434, as well as a state of each application of the one or more applications 434 and/or a state of a respective device that is associated with the computing device 402. A device state engine of the automated assistant 404 and/or the computing device 402 can access device data 432 to determine one or more actions capable of being performed by the computing device 402 and/or one or more devices that are associated with the computing device 402. Furthermore, the application data 430 and/or any other data (e.g., device data 432) can be accessed by the automated assistant 404 to generate contextual data 436, which can characterize a context in which a particular application 434 and/or device is executing, and/or a context in which a particular user is accessing the computing device 402, accessing an application 434, and/or any other device or module.

While one or more applications 434 are executing at the computing device 402, the device data 432 can characterize a current operating state of each application 434 executing at the computing device 402. Furthermore, the application data 430 can characterize one or more features of an executing application 434, such as content of one or more graphical user interfaces being rendered at the direction of one or more applications 434. Alternatively, or additionally, the application data 430 can characterize an action schema, which can be updated by a respective application and/or by the automated assistant 404, based on a current operating status of the respective application. Alternatively, or additionally, one or more action schemas for one or more applications 434 can remain static, but can be accessed by the application state engine to determine a suitable action to initialize via the automated assistant 404.

The computing device 402 can further include an assistant invocation engine 422 that can use one or more trained machine learning models to process application data 430, device data 432, contextual data 436, and/or any other data that is accessible to the computing device 402. The assistant invocation engine 422 can process this data to determine whether or not to wait for a user to explicitly speak an invocation phrase to invoke the automated assistant 404, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated to capture training data that characterizes contexts in which the user invokes the automated assistant and other contexts in which the user does not invoke the automated assistant.

When the one or more trained machine learning models are trained according to these instances of training data, the assistant invocation engine 422 can cause the automated assistant 404 to detect, or limit detecting, spoken invocation phrases from a user based on features of a context and/or an environment. Additionally, or alternatively, the assistant invocation engine 422 can cause the automated assistant 404 to detect, or limit detecting for one or more assistant commands from a user based on features of a context and/or an environment. In some implementations, the assistant invocation engine 422 can be disabled or limited based on the computing device 402 detecting an assistant suppressing output from another computing device. In this way, when the computing device 402 is detecting an assistant suppressing output, the automated assistant 404 will not be invoked based on contextual data 436—which would otherwise cause the automated assistant 404 to be invoked if the assistant suppressing output was not being detected.

In some implementations, the system 400 can include a device arbitration engine 416 that can assist with performing device arbitration when one or more devices and/or applications detect an input from a user. For example, in some implementations the device arbitration engine 416 can process data from one or more different devices to determine whether initialize a device arbitration process. In some implementations, data can be received via a network connection, one or more interfaces of the system 400, and/or any other modality through which a computing device can receive data. For example, the device arbitration engine 416 can determine that multiple different devices are projecting an ultrasonic sound and/or light in response to an assistant input. Based on this determination, the device arbitration engine 416 can initialize a process for selecting a particular device of the multiple different devices that will be responsive to the assistant input from the user.

In some implementations, the system 400 can include a gaze detection engine 418, which can determine a gaze of the user relative to one or more different objects in an environment of the user. For example, the system 400 can be computerized glasses that include an inward facing camera that is directed to one or more eyes of the user. Based on image data generated using the inward facing camera, the system 400 can identify a particular area in the environment that the user is directing their eyes toward. In some implementations, the gaze detection engine 418 can determine a direction of gaze of the user based on data from one or more different devices, such as a separate computing device that includes a camera. The image data from the separate computing device can indicate, with prior permission of the user, a posture of the user and/or a direction in which the user is directing one or more of their appendages. In this way, the gaze detection engine 418 can determine a direction in which the user is directing their attention before, during, and/or after the user provides an input to the automated assistant 404.

In some implementations, the system 400 includes a field of view engine 426, which can process data characterizing a field of view of the user and/or one or more cameras of a device. For example, the field of view engine 426 can process image data from one or more cameras of computerized glasses in order to identify one or more objects and/or devices that are located in a field of view of the camera at one or more instances of time. In some implementations, the field of view engine 426 can also process device data 432 in order to identify certain objects that may be associated with certain devices in a field of view of a user. For example, a kitchen sink may be an object that is associated with a standalone display device of a user. Therefore, the field of view engine 426 can determine that a standalone computing device is subject to a user input when the kitchen sink is identified in a field of view of the user when the user provided the user input.

In some implementations, the system 400 can include an interface content engine 424 for causing one or more interfaces of the system 400 to render content according to output from the device arbitration engine 416. For example, when the device arbitration engine 416 identifies the computing device 402 as being subject to an input from a user, the interface content engine 424 can cause content to be rendered at one or more interfaces of the computing device 402 (e.g., a display interface of computerized glasses). When the device arbitration engine 416 determines that the user directed an input to a separate computing device, and the separate computing device is in a field of view of the user, the interface content engine 424 can cause a notification to be rendered for the separate computing device. For example, the interface content engine 424 can cause graphical content to be rendered at a display interface of the computing device 402 when the computing device 402 is computerized glasses. The graphical content can be rendered such that the graphical content appears "on top of" and/or adjacent to the separate computing device in the field of view of the user (e.g., in an area of the lenses of the glasses corresponding to the location of the separate device). The graphical content can include, but is not limited to one or more icons, colors, and/or other graphical features that can indicate that the device arbitration engine 416 has selected the separate computing device as being responsive to the input from the user.

In some implementations, the device arbitration engine 416 may request additional input from the user in order to assist with identifying a particular device that the user intended to be subject to an input. The device arbitration engine 416 can communicate an identifier and/or location of the candidate devices to the interface content engine 424, which can render graphical indications, in the lenses of the computerized glasses, at or near a relative location of the candidate devices. For example, a first selectable element can be rendered at a left most portion of a display interface of the computerized glasses in order to indicate that a computing device in a left most portion of the field of view of the user is a candidate device. A second selectable element can be rendered in a more central location of the display interface, simultaneous to the first selectable element, in order to indicate that another computing device in a central portion of the field of view of the user is also a candidate device. The user can then perform a gesture (e.g., holding up their index finger) in front of their face, in order that one or more cameras of the computerized glasses will capture the gesture. The gesture can indicate to the automated assistant 404 that a particular device (e.g., the central most device) is the device that the user intended to be responsive to user input.

Figure 5:
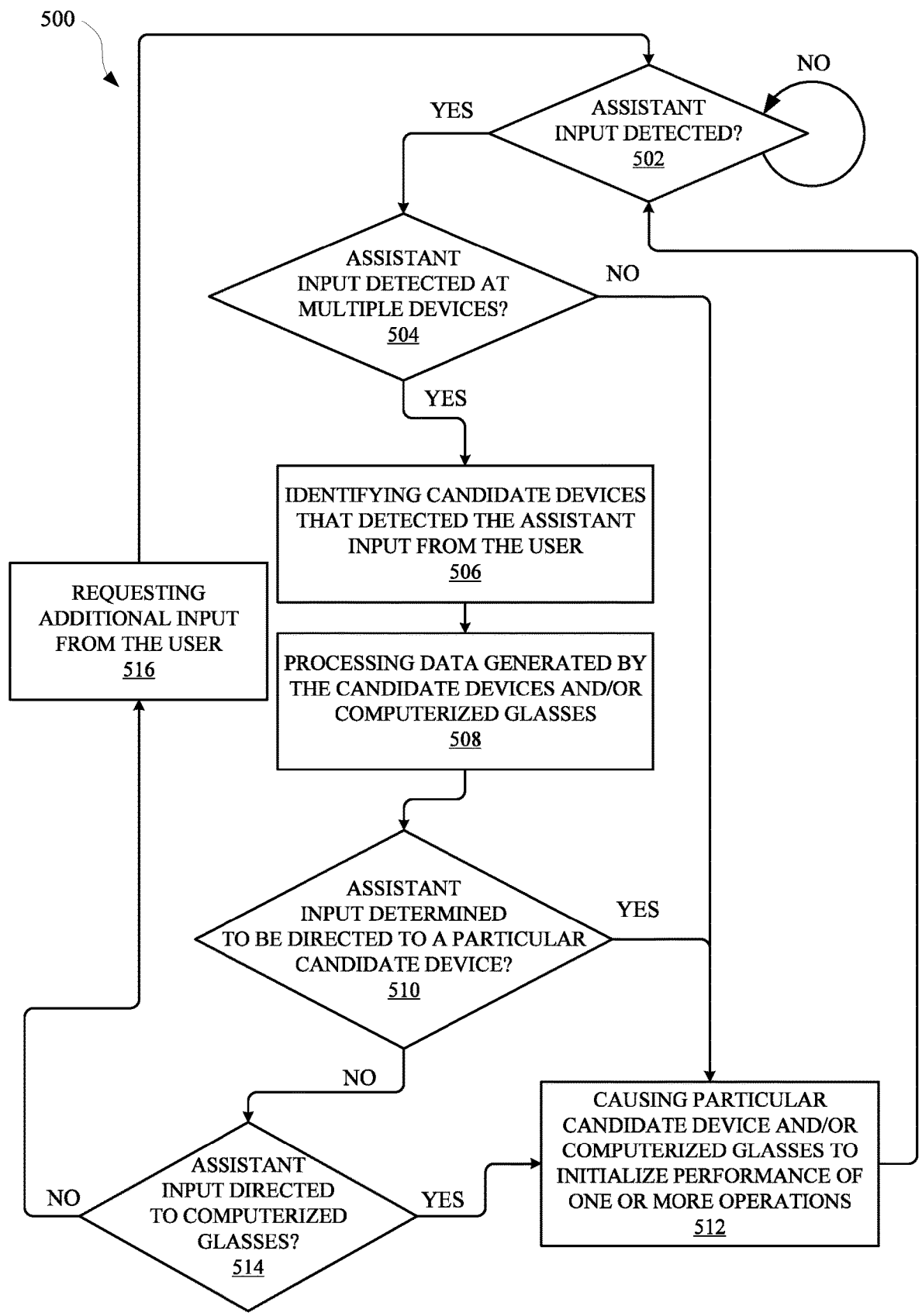
FIG. 5 illustrates a method for effectuating device arbitration in a multi-device environment using data available from a wearable computing device, such as computerized glasses.

FIG. 5 illustrates a method 500 for effectuating device arbitration in a multi-device environment using data available from a wearable computing device, such as computerized glasses. The method 500 can be performed by one or more computing devices, applications, and/or any other apparatus or module that can be associated with an automated assistant. The method 500 can include an operation 502 of determining whether an assistant input has been detected. The assistant input can be a user input that is provided by a user to one or more computing devices that provide access to an automated assistant. In some implementations, the assistant input can be provided to a computing device with augmented reality functionality, such as computerized glasses, computerized contact lenses, a phone, a tablet device, a portable computing device, a smartwatch, and/or any other computing device that can augment perception of one or more users. It should be noted that in the implementations discussed herein that include computerized glasses, the computerized glasses can be any computer device that provides augmented reality functionality. When the assistant input is detected, the method 500 can proceed from the operation 502 to an operation 504. Otherwise, the automated assistant can continue to determine whether a user has provided input to the automated assistant.

The operation 504 can be an optional operation that includes determining whether the assistant input was detected at multiple devices. For example, the user can be wearing a pair of computerized glasses while gazing at a standalone speaker device that provides access to the automated assistant. Therefore, when the user provides the assistant input, the assistant input can be detected at the computerized glasses, the standalone speaker device, and one or more other devices in an environment of the user. When a single computing device has exclusively detected the assistant input, the method 500 can proceed from the operation 504 to an operation 512, in which the particular computing device that detected the assistant input is caused to initialize performance of one or more operations. However, when multiple devices have detected the assistant input, the method 500 can proceed from the operation 504 to an operation 506, to initialize device arbitration for selecting one or more devices for responding to the assistant input.

The operation 506 can include identifying candidate devices that detected the assistant input from the user. For example, when the assistant input is a spoken utterance, the automated assistant can identify multiple devices that captured audio data corresponding to the spoken utterance. In some implementations, each candidate device can capture audio data and process the audio data to generate a score for the assistant input. When each score on each candidate device satisfies at threshold, device arbitration can be initialized for those candidate devices. For example, the candidate devices can include the computerized glasses, the standalone speaker device, and a tablet device that the user may have set down on a table near the user. The method 500 can proceed from the operation 506 to an operation 508 to further a determination of whether the assistant input was directed to a particular computing device.

The operation 508 can include processing data generated at the candidate devices and/or the computerized glasses. For example, the computerized glasses can include an outward facing camera and/or an inward facing camera that can be used to generate image data for identifying a particular device that the user may be directing the assistant input. Image data generated using the outward facing camera can capture an image that includes one of the candidate devices and/or an object associated with a candidate device. For instance, the standalone speaker device may be supported by a decorative table that the user was looking at when the user provided the assistant info. As a result, when the decorative table and/or the standalone speaker device is determined to be in a viewing window of the user and/or the computerized glasses, the automated assistant can determine that assistant input was directed to the standalone speaker device. Alternatively, or additionally, one or more of the candidate devices can provide an output that can be detected by one or more sensors of the computerized glasses. Therefore, when the computerized glasses detect an output from a particular device of the candidate devices, the automated assistant can determine that the assistant input was directed to that particular device.

The method 500 can proceed to an operation 510, which can include determining whether the assistant input was directed to a particular candidate device based on the processing at operation 508. When the automated assistant determines that the assistant input is directed to a particular candidate device, aside from the computerized glasses, the method 500 can proceed from the operation 510 to the operation 512. Alternatively, when the automated assistant and/or another application determines that the assistant input was not directed to a particular candidate device, the method 500 can proceed from the operation 510 to an operation 514.

The operation 514 can include determining whether the system input was directed to the computerized glasses and/or another computing device that provides augmented reality functionality. For example, the user can provide a spoken utterance when they are hand-writing in a notebook while wearing the computerized glasses. Therefore, although the other candidate devices may have detected the spoken utterance from the user, none of the other candidate devices may be visible in a viewing window of the computerized glasses. As a result, the automated assistant can determine that the user intended for the automated assistant to respond to the spoken utterance via the computerized glasses. For example, the user may request that the automated assistant check the spelling of a word written in a notebook while the user is gazing at the notebook and wearing the computerized glasses. In response, the automated assistant can cause the computerized glasses to render one or more of graphical elements indicating whether the word is spelled correctly in the notebook via augmented reality and/or provide an audible output via one or more speakers of the computerized glasses.

When the automated assistant determines that the assistant input is directed to the computerized glasses, the method 500 can proceed from the operation 514 to the operation 512. Otherwise, the method 500 can proceed from the operation 514 to an operation 516. The operation 516 can be an optional operation that includes requesting additional input from the user to assist the automated assistant with identifying a particular computing device that the user intended the assistant input to be directed to. Thereafter, the method 500 can proceed from the operation 516 to the operation 502 and/or the operation 504.

Figure 6:
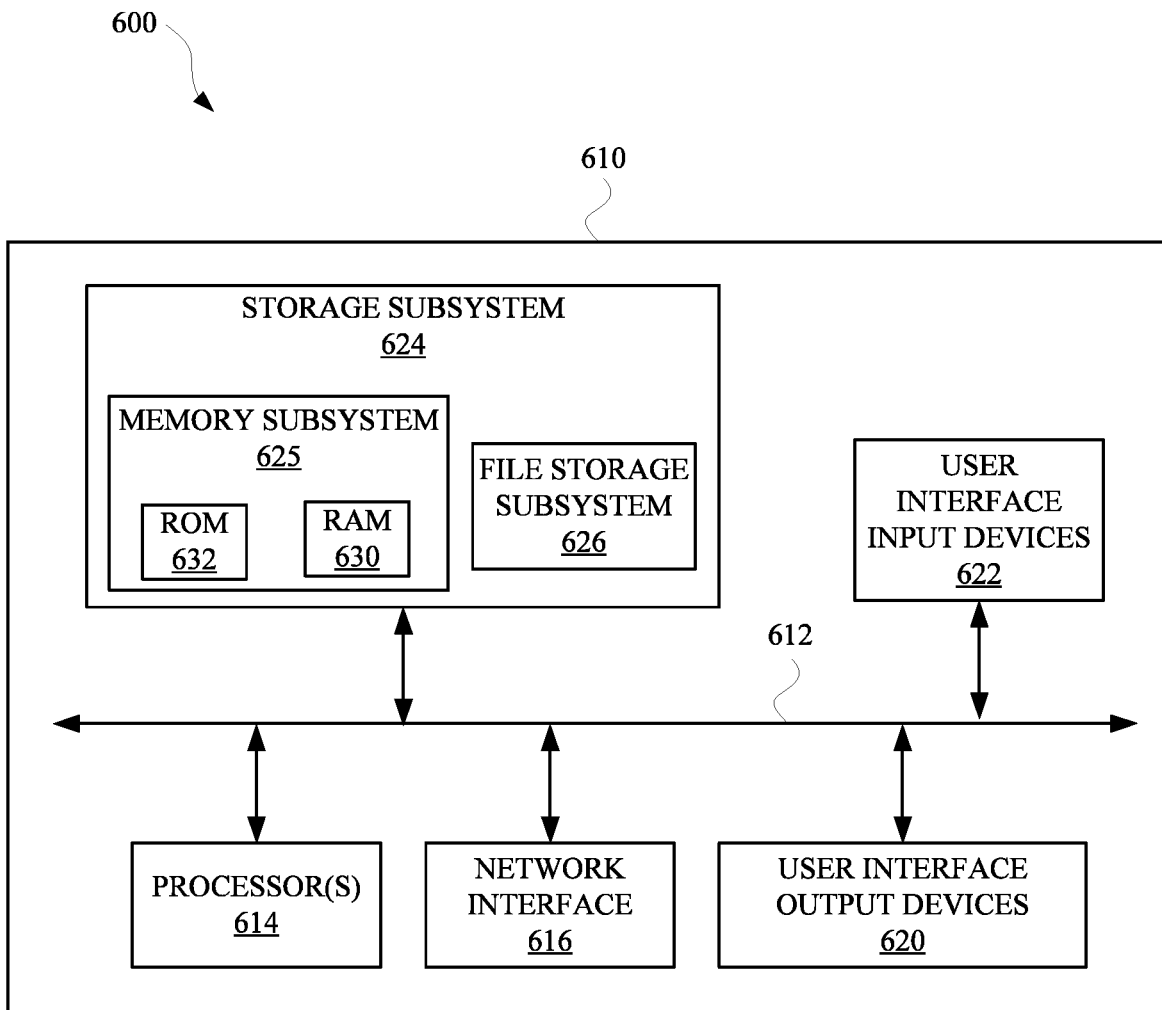
FIG. 6 is a block diagram of an example computer system.

FIG. 6 is a block diagram 600 of an example computer system 610. Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 500, and/or to implement one or more of system 400, computerized glasses 104, television 106, tablet device 110, computing device 122, computerized glasses 204, television 306, computerized glasses 304, tablet device 310, computing device 342, and/or any other application, device, apparatus, and/or module discussed herein.

These software modules are generally executed by processor 614 alone or in combination with other processors. Memory 625 used in the storage subsystem 624 can include a number of memories including a main random access memory (RAM) 630 for storage of instructions and data during program execution and a read-only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, zip code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary, and that the actual parameters, dimensions, materials, and/or configurations will depend upon the specific application or applications for which the teachings is/are used. Those skilled in the art will recognize, or be able to ascertain, using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining that a user has directed an assistant input to an automated assistant that is accessible via any one computing device of multiple computing devices that are connected to a network, wherein the user is wearing computerized glasses, the computerized glasses being a computing device that includes one or more cameras, and wherein the user is located in an environment that includes the multiple computing devices. The method can further include an operation of identifying, based on the assistant input from the user, two or more candidate devices, of the multiple computing devices, that detected the assistant input from the user, wherein the two or more candidate devices are separate from the computerized glasses. The method can further include an operation of determining, based on processing image data generated using the one or more cameras of the computerized glasses, whether the assistant input is directed to a particular computing device, of the two or more candidate devices, or the computerized glasses. In some implementations, the method can further include an operation of, when the assistant input is determined to be directed to the particular computing device, of the two or more candidate devices: causing the particular computing device to perform one or more operations corresponding to the assistant input.

In some implementations, determining whether the assistant input is directed to the particular computing device, of the two or more candidate devices, or the computerized glasses includes: determining, based on the image data, whether the particular computing device of the two or more candidate devices is located in a viewing window of the one or more cameras. In some implementations, a camera of the one or more cameras of the computerized glasses is directed towards an eye of the user, and determining that the particular computing device of the two or more candidate devices is associated with a visual perspective of the user includes: determining that a gaze of the user is directed more towards the particular computing device than towards any other device of the two or more candidate devices.

In some implementations, determining whether the assistant input is directed to the particular computing device, of the two or more candidate devices, or the computerized glasses includes: determining whether a particular object in a viewing window of the one or more cameras is associated with a relative location of the particular computing device of the two or more candidate devices. In some implementations, the particular computing device is not located in the viewing window of the one or more cameras of the computerized glasses. In some implementations, the assistant input is a physical gesture performed by the user, and the physical gesture is detected by the computerized glasses. In some implementations, the computerized glasses include a graphical display interface that is rendering content when the user provides the assistant input, and wherein the method further comprises: when the assistant input is determined to be directed to the computerized glasses: causing the content being rendered at the graphical display interface of the computerized glasses to be modified according to the physical gesture.

In some implementations, the method further comprises: when the assistant input is determined to be directed to the computerized glasses and the particular computing device: causing a first portion of content to be rendered at the particular computing device, and causing a second portion of content to be rendered at a display interface of the computerized glass. In some implementations, the particular computing device is a detachable accessory device that is connected to a display device, and the particular computing device is not visible in a viewing window of the one or more cameras of the computerized glasses. In some implementations, the computerized glasses include a graphical display interface that is at least partially transparent when the graphical display interface is rendering content, and wherein the method further comprises: when the assistant input is determined to be directed to the particular computing device, of the two or more candidate devices: causing a graphical element to be rendered at a location in the graphical display interface corresponding to the particular computing device.

In some implementations, the assistant input includes a request for the automated assistant to initialize a particular application, and the graphical element is based on the particular application. In some implementations, identifying the two or more candidate devices, of the multiple computing devices, that detected the assistant input from the user includes: determining that the particular computing device is rendering a first output and another computing device of the multiple computing devices is rendering a second output, wherein the first output and the second output are detected by the computerized glasses.

In some implementations, the particular computing device includes a graphical display interface and the first output includes a graphical element that is rendered at the graphical display interface, and the graphical element is embodied in one or more graphical content frames that are rendered at a frequency of greater than or equal to 60 frames per second. In some implementations, the first output is different from the second output, and determining whether the assistant input is directed to the particular computing device, of the two or more candidate devices, or the computerized glasses includes: determining that the first output was detected within a viewing window of the computerized glasses and the second output was not detected within the viewing window of the computerized glasses.

In other implementations, a method implemented by one or more processors is set forth as including operations such as determining, by a computing device, that a user has provided an input to an automated assistant that is accessible via one or more computing devices that are located in an environment with the user, wherein the input corresponds to a request for the automated assistant to provide content for the user, and wherein the one or more computing devices include computerized glasses that the user is wearing when the user provided the input. The method can further include an operation of identifying, based on the input from the user, a particular device to render the content for the user, wherein the particular device is separate from the computerized glasses. The method can further include an operation of causing, based on identifying the particular device, the particular device to render the content for the user. The method can further include an operation of processing contextual data that is provided by the one or more computing devices that were in the environment of the user when the user provided the input. The method can further include an operation of determining, based on the contextual data, whether to provide the user with additional content that is associated with the request. The method can further include an operation of when the automated assistant determines to provide the additional content to the user: causing the computerized glasses to perform one or more additional operations in furtherance of rendering the additional content via one or more interfaces of the computerized glasses.

In some implementations, the contextual data includes image data that is provided by one or more cameras of the computerized glasses, and determining whether to provide the user with the additional content associated with the request includes: determining whether the user is looking at the particular device when the particular device is performing the one or more operations. In some implementations, causing the computerized glasses to render the additional content includes: causing the computerized glasses to access content data via a network connection, and causing a display interface of the computerized glasses to render one or more graphical elements based on the content data.

In yet other implementations, a method implemented by one or more processors is set forth as including operations such as determining, by a computing device, that a user provided an input to an automated assistant that is accessible via the computing device, wherein the input corresponds to a request for the automated assistant to perform one or more operations. The method can further include an operation of receiving, by the computing device, contextual data that indicates the user is wearing computerized glasses, wherein the computerized glasses are separate from the computing device. The method can further include an operation of causing, based on the contextual data, an interface of the computing device to render an output that can be detected at another interface of the computerized glasses. The method can further include an operation of determining whether the computerized glasses detected the output from the computing device. The method can further include an operation of, when the computing device determines that the computerized glasses detected the output: causing the computing device to perform the one or more operations in furtherance of fulfilling the request.

In some implementations, determining whether the computerized glasses detected the output from the computing device includes: processing other contextual data that indicates whether one or more cameras of the computerized glasses detected the output from the computing device. In some implementations, the method can further include an operation of, when the computing device determines that the computerized glasses detected the output: causing the computerized glasses to render one or more graphical elements that can be selected in response to a physical gesture from the user.

We claim:

1. A method implemented by one or more processors, the method comprising:
   determining that a user located in an environment has directed an assistant input to an automated assistant that interacts with multiple computing devices that are connected to a network and that are also located in the environment,
   wherein the user is wearing computerized glasses of the multiple computing devices, and wherein the computerized glasses include one or more cameras and a display interface;
   determining, based on processing the assistant input:
   an action specified by the assistant input, and
      a first computing device via which the action can be performed, the first computing device being one of the multiple computing devices and being separate from the computerized glasses;
   in response to the assistant input, and in response to determining the action and the first computing device:
   causing an icon, that indicates the action, to be rendered, at the display interface of the computerized glasses using augmented reality, above the first computing device; and
   in response to determining occurrence of a user selection that is directed to rendering of the icon at the display interface using augmented reality:
   causing the first computing device to perform the action associated with the assistant input.

2. The method of claim 1, further comprising:
   determining, based on processing the assistant input, a particular application for performing the action specified by the assistant input; and
   selecting the icon, for rendering of the icon at the display interface using augmented reality, based on the icon indicating the particular application.

3. The method of claim 2, wherein the assistant input specifies the particular application.

4. The method of claim 1, wherein the first computing device is captured in image data from one or more of the cameras of the computerized glasses, and wherein causing the icon to be rendered above the first computing device is in response to the first computing device being captured in the image data.

5. The method of claim 4, wherein a second computing device of the multiple computing devices, that is also separate from the computerized glasses, is also captured in the image data, and further comprising:
   determining the action can also be performed via the second computing device; and
   in response to determining the action can also be performed via the second computing device:
   causing an additional instance of the icon to be rendered, at the display interface using augmented reality and along with rendering of the icon, above the second computing device based on the second device being captured in the image data.

6. The method of claim 5, further comprising:
   determining, subsequent to rendering the icon above the first computing device and rendering the additional instance of the icon above the second computing device, that the second computing device is no longer captured in the image data,
wherein determining the user selection is based on determining the second computing device is no longer captured in the image data.

7. The method of claim 5, further comprising:
determining, subsequent to rendering the icon above the first computing device and rendering the additional instance of the icon above the second computing device, that a gaze of the user is directed toward the first computing device;
wherein determining the user selection is based on the gaze of the user being directed toward the first computing device.

8. The method of claim 5, wherein causing the icon to be rendered includes causing the icon to be initially rendered with one or more features that indicate a need for user selection and wherein causing the additional instance of the icon to be rendered includes causing the additional instance of the icon to be rendered with the one or more features that indicate the need for selection and further comprising:
in response to determining the user selection, causing the icon to be rendered with one or more other features that indicate the first computing device has been selected.

9. The method of claim 8, wherein the one or more features that indicate the need for user selection include being grayed out and the one or more other features that indicate the first computing device has been selected include no longer being grayed out.

10. The method of claim 1, further comprising:
identifying a gaze, of the user, is directed to the first computing device; and
causing, based on identifying the gaze is directed to the first computing device, the icon to exhibit one or more first characteristics.

11. The method of claim 10, wherein the user selection is based on a gaze of the user that is directed to the first computing device and wherein causing the first computing device to perform the action associated with the assistant input is based on the gaze of the user continuing to be directed to the first computing device for a threshold period of time following causing the icon to exhibit the one or more first characteristics.

12. The method of claim 1, further comprising:
rendering an indication, at the display interface using augmented reality and along with the icon, that the first computing device will be selected to perform the action if additional user input is not received.

13. The method of claim 12, wherein the indication includes a timer indicating a remaining amount of time prior to causing the first computing device to perform the action associated with the assistant input and the first computing device.

14. A system comprising:
one or more storage devices storing instructions;
one or more processors that are operable to execute the instruction to cause the one or more processors to perform operations comprising:
determining that a user located in an environment has directed an assistant input to an automated assistant that interacts with multiple computing devices that are connected to a network and that are also located in the environment,
wherein the user is wearing computerized glasses of the multiple computing devices, and wherein the computerized glasses include one or more cameras and a display interface;
determining, based on processing the assistant input:
an action specified by the assistant input, and
a first computing device via which the action can be performed, the first computing device being one of the multiple computing devices and being separate from the computerized glasses;
in response to the assistant input, and in response to determining the action and the first computing device:
causing an icon, that indicates the action, to be rendered, at the display interface of the computerized glasses using augmented reality, above the first computing device; and
in response to determining occurrence of a user selection that is directed to rendering of the icon at the display interface using augmented reality:
causing the first computing device to perform the action associated with the assistant input.

15. The system of claim 14, wherein the operations further comprise:
determining, based on processing the assistant input, a particular application for performing the action specified by the assistant input; and
selecting the icon, for rendering of the icon at the display interface using augmented reality, based on the icon indicating the particular application.

16. The system of claim 15, wherein the assistant input specifies the particular application.

17. The system of claim 14, wherein the first computing device is captured in image data from one or more of the cameras of the computerized glasses, and wherein causing the icon to be rendered above the first computing device is in response to the first computing device being captured in the image data.

18. The system of claim 17, wherein a second computing device of the multiple computing devices, that is also separate from the computerized glasses, is also captured in the image data, and wherein the operations further comprise:
determining the action can also be performed via the second computing device; and
in response to determining the action can also be performed via the second computing device:
causing an additional instance of the icon to be rendered, at the display interface using augmented reality and along with rendering of the icon, above the second computing device based on the second device being captured in the image data.

19. The system of claim 18, wherein the operations further comprise:
determining, subsequent to rendering the icon above the first computing device and rendering the additional instance of the icon above the second computing device, that the second computing device is no longer captured in the image data,
wherein determining the user selection is based on determining the second computing device is no longer captured in the image data.

20. The system of claim 18, wherein the operations further comprise:
determining, subsequent to rendering the icon above the first computing device and rendering the additional instance of the icon above the second computing device, that a gaze of the user is directed toward the first computing device;

wherein determining the user selection is based on the gaze of the user being directed toward the first computing device.

* * * * *